Feb. 11, 1936.   C. L. EKSERGIAN   2,030,104
ROLLER BEARING FOR ROLLING MILLS
Filed Oct. 6, 1931
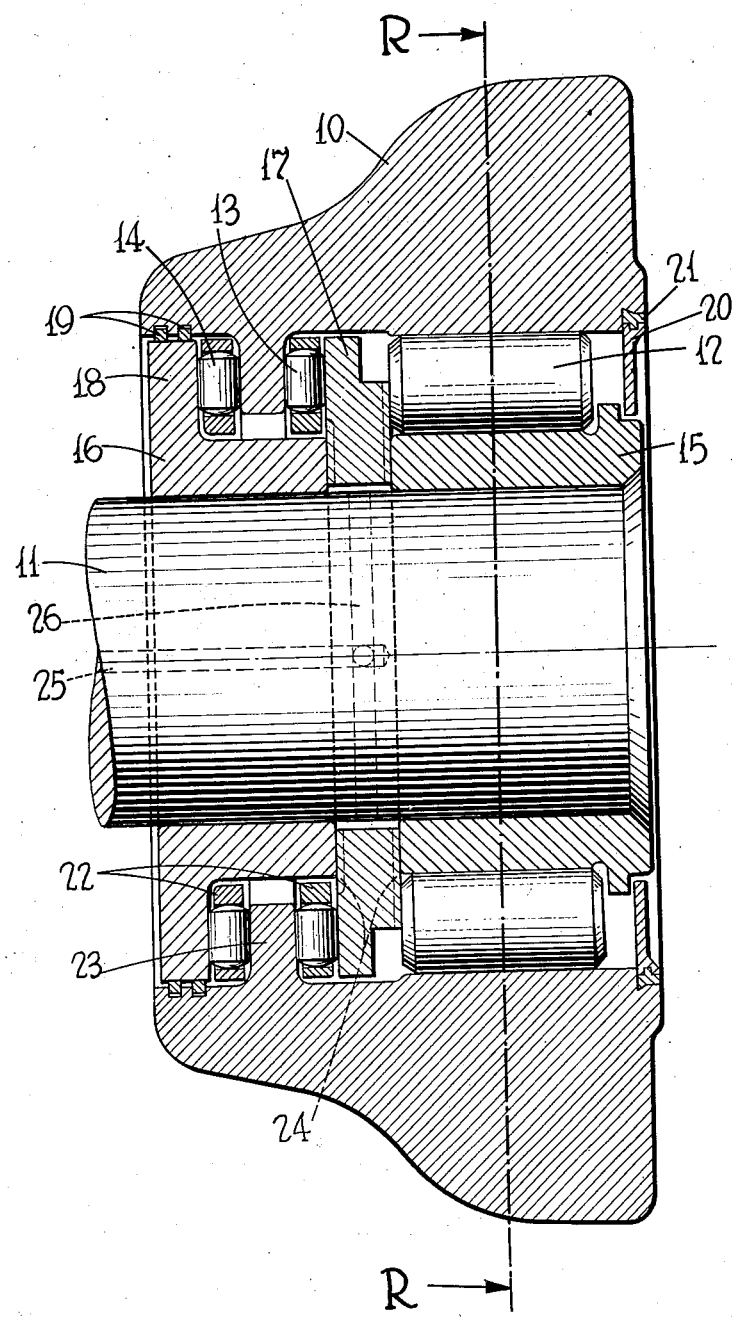
INVENTOR.
CAROLUS L. EKSERGIAN
BY John P. Tarbox
ATTORNEY.

Patented Feb. 11, 1936

2,030,104

UNITED STATES PATENT OFFICE 2,030,104

ROLLER BEARING FOR ROLLING MILLS

Carolus L. Eksergian, Detroit, Mich., assignor to Budd Wheel Company, Philadelphia, Pa., a corporation of Pennsylvania Application October 6, 1931, Serial No. 567,153

5 Claims. (Cl. 80—16)

My invention relates to improvements in bearings for the rolls of rolling mills.

It is an object of my invention to provide an efficient bearing arrangement for rolls of this class, and it is a further object of my invention to provide bearings symmetrically disposed with respect to the heavy axial and radial loads to which such rolls are subjected under normal rolling pressures.

In the rolls of the prior art, a marked degree of inconvenience and trouble has been experienced, resulting in the necessity for frequent repairs. These repairs have been occasioned by the wearing of various component parts of the bearings and rolls, and have often necessitated a complete re-machining of the bearing parts. While I do not claim that the roller bearing arrangement comprising my invention is free from the necessity of occasional repair, I do claim that this arrangement wears longer and requires less repair than the bearings of the prior art.

The bearing arrangement comprising my invention is especially applicable to the rolls of a rolling mill such as is disclosed in the patent to Smith, No. 1,606,906, in which an opposing pair of traversing rolls is used in the rolling of a tapered metallic disc. Traversing rolls of this nature are subject to high radial and axial thrust stresses, and the bearings therefor must be so designed and located as to withstand the above-mentioned stresses.

Other objects and advantages of my invention will be obvious from a reading of the sub-joined specification in the light of the attached drawing, in which, The figure is a detailed cross sectional view through the roll axis.

Referring to the drawing by reference characters, the numeral 10 indicates a roll for a rolling mill, to which my invention is particularly applicable. This roll 10 is commonly known as a tread ring and will hereinafter be referred to as such. Tread ring 10 is mounted to freely revolve on shaft 11 by means of an annular series of roller bearings 12, positioned centrally of the main body of the tread ring 10, with respect to the axis thereof. Bearings 12 are positioned radially by front sleeve 15, which fits closely upon shaft 11.

The inner periphery of tread ring 10 is provided with a radially inwardly extending web 23 disposed centrally of the reduced portion of the tread ring, and this web is accurately machined on each of its faces to provide bearing surfaces for axial thrust bearings 13 and 14, symmetrically disposed thereabout. Each of these bearings is comprised of an annular series of equally spaced rolls, contained in suitable cages 22.

A back sleeve 16 is provided on shaft 11, having a radially projecting flange 18, the inner face of which is accurately machined to provide a stationary bearing surface for bearings 14. A pair of oil-retaining rings 19 are fitted to the outer peripheral edge flange 18, and fit into corresponding grooves in the inner peripheral wall of the ring 10. Front sleeve 15 and back sleeve 16 are spaced apart axially by an annular thrust plate 17, having a series of radially extending grooves or slots 24, the purpose of which will be later described. Thrust plate 17 acts as a raceway for bearing 13 and as a retainer for bearing 12.

A retainer plate 20 is shown, secured firmly on the end of the tread ring 10 by means of a series of metallic plugs 21, which are driven in to effect this connection. These plugs are of a soft metal, and are adapted to expand into recessed portions in the plate and the tread ring.

To provide adequate lubrication for the bearings 12, 13 and 14, I have shown a drilled passage 25 in shaft 11, running co-axially with said shaft to approximately the depth shown. Centrally of the thrust plate 17, a series of radially extending passages 26 are drilled or otherwise formed in the shaft 11. As the shaft 11 is stationary except for longitudinal movement, grease or oil or other suitable lubricant may be introduced through the passages 25 and 26 and eventually through slots 24 into the respective bearings while the rolling mill is in operation.

The component parts of my invention thus being described, I shall now proceed to explain their operation, showing the advantages inherent in my novel design. In a machine of the type shown in the patent to Smith, No. 1,606,906, mentioned above, a plurality of rolls are diametrically disposed within a head and are adapted to traverse the work as their respective shafts are reciprocated. In rolling wheel discs, a rotatable table in the machine carries the disc blank to be rolled. The machine head, carrying the freely revolving rolls, is lowered into contact with the revolving disc blank, and the rolls in the head are fed back and forth radially of the disc, rolling the same to the desired taper and diameter. Thus it will be seen that rolls in this type of rolling mill are necessarily subjected to high radial strains and axial thrusts as the rolls traverse the work. A piece of work such as a disc has a tendency to curl upward around its outer periphery as it is being rolled, and thus a roll of this nature receives a tremendous amount of end thrust as well as radial thrust.

As stated above, I have endeavored to provide a system of bearings for a rolling mill roll, that would be symmetrically disposed with respect to the maximum loads imposed thereon. This provision has been accomplished by the arrangement of radial and thrust bearings shown and described. The radial bearing 12 is positioned symmetrically with respect to the maximum load plane R—R of the roll. This load plane has been found to intersect the tread surface of the roll slightly ahead of the true cylindrical portion thereof. This phenomenon is due largely to the fact that the work being rolled curls at the outer edge, as mentioned above. This condition occurs, of course, only when the rolls are moving radially outwardly of the work, or from right to left in the accompanying drawing.

With the bearing 12 positioned as shown, it has been found that an optimum condition of wear has been attained. Fewer shutdowns for repair have been one of the results, due obviously to the fact that the bearings 12 wear evenly because of their symmetrical disposition with respect to the loads imposed on the roll.

Thrust bearings 13 and 14 also play a large part in the general arrangement of bearings comprising my invention. Bearings 13, particularly, assumes a high loading as the roll moves from right to left, outwardly of the work, by virtue of the fact that the work curls upward and must be forced down to the table by forces finding their components resolved into vertical and horizontal planes. The return movement of the roll toward the center of the work is also accompanied by very severe axial thrusts, and it is here that bearings 14 find their use.

Other advantages will be apparent to those skilled in the art. For instance, the fact that the bearings 13 and 14 minimize end play is readily understood. Also, the fact that the general bearing arrangement shown may be assembled easily, is apparent.

Modifications of my inventive concept may be made without departing from the spirit thereof, and I do not, therefore wish to be limited except by the scope of the appended claims, which should be interpreted with a breadth of understanding commensurate with the generic spirit of my invention.

What I claim is:

1. A roll assembly for the radial rolling of wheel discs comprising, in combination, a shaft, a tread ring mounted upon said shaft through a plurality of sets of anti-friction rollers interiorly thereof and intermediate said shaft and ring, a radially inwardly extending web portion interiorly of said ring, a plurality of sets of axial thrust bearings being arranged at either side of said web each to carry axial thrusts, and a set of bearings arranged symmetrically with the load plane of the roll and arranged to carry radial thrusts, means providing retaining wall and race-way portions for said radial thrust bearings, means comprising an annular member of L-shaped cross-section providing race-way and retaining wall portions for one set of said axial thrust bearings, and means intermediate said afore-mentioned retaining wall and raceway means having a retaining portion for said radial thrust bearings and a race-way portion for the second of said axial thrust bearings.

2. In a mounting structure for a rolling mill roll the combination of a fixed shaft, a tread ring mounted thereon by means of a plurality of sets of anti-friction bearings, an inwardly extending web on said tread ring, a pair of sets of bearings mounted on each side of said web adapted to receive axial thrusts, the sides of said web constituting raceways for said bearings, a set of radial thrust bearings, a raceway therefore, an annular ring constituting on one side a retainer for said radial thrust bearings and on the other side a raceway for one set of said axial thrust bearings and an annular sleeve of substantially L-shaped cross-section serving to retain said ring between it and said radial thrust bearing raceway and having a portion serving as a raceway for one of said sets of axial thrust bearings.

3. In a mounting structure for a rolling mill roll the combination of a fixed shaft, a tread ring mounted for rotation therearound by means of a plurality of sets of anti-friction bearings, a set of radial thrust bearings, a raceway therefor secured to said shaft, said raceway having at one end an integral radially extending wall serving as a retainer for said bearings, a pair of sets of axial thrust bearings, a raceway for one of said sets of bearings comprising a sleeve substantially L-shaped in cross section, and a ring clamped between said raceways, said ring constituting on one side a raceway for said second set of axial thrust bearings, and on the other side a retainer for said radial thrust bearings.

4. In a mounting structure for a rolling mill roll the combination of a fixed shaft, a tread ring mounted thereon by means of a plurality of sets of anti-friction bearings, said bearings comprising a set of radial thrust bearings and a set of axial thrust bearings, a slotted ring disposed between said sets of bearings constituting on one side a raceway for said axial thrust bearings and on the other side a retainer for said radial thrust bearings, and means for introducing a lubricant through the slots in said ring to lubricate said bearings.

5. In a mounting structure for a rolling mill roll the combination of a fixed shaft, a tread ring mounted thereon by means of a plurality of sets of anti-friction bearings, said bearings comprising a set of radial thrust bearings and a set of axial thrust bearings, a ring mounted on said fixed shaft between said sets of bearings, spaced radially from said shaft and having therein a plurality of radially disposed passageways, and means for introducing oil through said fixed shaft to the space between said ring and said shaft whereby said oil may flow out through said radially disposed passageways to lubricate said bearings.

CAROLUS L. EKSERGIAN.